United States Patent [19]

Krupp et al.

[11] 3,743,788

[45] July 3, 1973

[54] TIME CODED SIGNALLING TECHNIQUE FOR WRITING CONTROL MEMORIES OF TIME SLOT INTERCHANGERS AND THE LIKE

[75] Inventors: Roy Stephen Krupp, Rumson; Lawrence Andrew Tomko, Middletown, both of N.J.

[73] Assignee: Bell Telephone Laboratories, Incorporated, Murray Hill, N.J.

[22] Filed: Dec. 2, 1971

[21] Appl. No.: 204,142

[52] U.S. Cl. ............................ 179/15 AQ, 340/174

[51] Int. Cl. ............................................... H04j 3/08

[58] Field of Search ................... 179/15 AQ, 18 FC, 179/186 F, 15 AM; 340/174, 172.5

[56] References Cited

UNITED STATES PATENTS

| | | | |
|---|---|---|---|
| 3,281,537 | 10/1966 | Dupieux et al. | 179/15 AQ |
| 3,629,846 | 12/1971 | Thompson | 179/15 AQ |
| 3,458,659 | 7/1969 | Sternung | 179/15 AQ |
| 3,632,884 | 1/1972 | Inose et al. | 179/15 AQ |
| 3,632,883 | 1/1972 | Aagaard | 179/15 AQ |
| 3,217,106 | 11/1965 | Mukoga | 179/15 AQ |

*Primary Examiner*—Kathleen H. Claffy
*Assistant Examiner*—Thomas D'Amico
*Attorney*—R. J. Guenther et al.

[57] ABSTRACT

A first set of time division multiplex signal communication equipment has plural output gates distributed along the length of a signal propagation path thereof to be actuated selectively in different predetermined time slots. A different control memory shift register of corresponding length is provided for each gate to store a control signal pattern that determines when such gate is to operate. A memory signal pattern is altered by an analogous set of signal communication equipment. Plural timing signals, which are representative of a predetermined time of operation of a gate of the first equipment set, are applied to different paths in the analogous equipment set, and those signals interact to produce an output from the analogous equipment for automatically writing a signal pattern in the correct control memory register in the correct time slot for operating the corresponding gate in the first set of equipment.

14 Claims, 3 Drawing Figures

Patented July 3, 1973 3,743,788

2 Sheets-Sheet 1

TIME CODED SIGNALLING TECHNIQUE FOR WRITING CONTROL MEMORIES OF TIME SLOT INTERCHANGERS AND THE LIKE

BACKGROUND OF THE INVENTION

1. Field of the Invention

This invention relates to time division signal communication equipment in which control memories are provided for selectively actuating equipment selection gates to establish predetermined communication paths through the equipment during each of the successive time slots of a time division signal frame. The invention relates in particular to arrangements for writing control signal patterns into those control memories.

2. Prior Art

Control memories for time division signal communication equipment usually store in each of plural time slot word locations a signal representation, such as the binary coded number, of a piece of equipment which is to be actuated during a time slot corresponding to that word location. Operation of such control memories requires some sort of pathfinding equipment, usually programmed by a central processing unit (CPU), for deriving identifications of time slots during which a selected piece of communication equipment is to be actuated. These time slot identifications are often provided in binary coded bit-parallel format so that a separate circuit is required from the CPU to the appropriate control memory for each digit of the coded time slot number. Such coded time slot numbers are then decoded at the memory to a 1-out-of-*n* format and used together with the binary coded equipment numbers to write signal representations of the latter numbers into the selected control memory time slot word locations. On each control memory cycle, each time slot word location is read out in sequence and decoding equipment associated with each control memory reduces the equipment number code from a binary coded format to another 1-out-of-*n* format so that an individual output lead can extend an actuation signal to a single corresponding piece of time division communication equipment.

Each decoding operation requires extra electric circuit hardware or requires utilization of CPU operation time in order to convert signals between a binary coded format and a 1-out-of-*n* format. Furthermore, all of the electric circuits extending from decoders to particular equipment units take up considerable space, impose metallization cost requirements, and generate an amount of heat which causes substantial difficulty in devising methods for heat dissipation, as well as being indicative of substantial power supply requirements. In addition, the decoding operations and the output leads to controlled equipment usually include numerous signal path crossovers that are difficult to implement in semiconductor integrated circuits or in one of the newer planar shifting technologies, such as magnetic single-wall domain technology.

It is, therefore, one object of the present invention to improve control memory writing arrangements.

It is another object to facilitate the writing of control memories for time division communication equipment with reduced numbers of electric circuits and electric circuit crossovers.

A further object is to facilitate the performance of the control memory function by equipment constructed in accordance with planar shifting technology.

Yet another object is to reduce the extent of central processing unit access time required for operating time division communication equipment that utilizes control memories.

SUMMARY OF THE INVENTION

The foregoing and other objects of the invention are realized in an illustrative embodiment thereof in which a first, or transmission, set of time division multiplex signal communication equipment has plural signal coupling gates distributed along the length of a signal propagation path therein to be actuated selectively in different time slots. Control memories are provided to store for each gate a control signal pattern that determines when such gate is to operate. A second analogous set of signal communication equipment receives timing signals, which are representative of predetermined times of operation of a certain one of the transmission equipment set gates. The timing signals are applied to propagation paths in the analogous equipment set so that those signals interact to produce automatically an output from the analogous set of equipment for writing a signal in the correct part of the control memories, and in the correct time slot, for operating the mentioned certain gate in the transmission set of equipment.

It is a feature of one embodiment of the invention that each of the two sets of communication equipment includes a pair of shift registers arranged for propagation in opposite directions but having signal interaction gates at predetermined points distributed along the length of at least one of the registers of each pair. Signals propagated through the pair of those registers in the analogous equipment meet at a gate determined by the relative magnitudes of the insertion times of those signals in the respective registers of the pair, and the signals interact at that gate to produce an output through a branch path to a correspondingly located control memory part. Such output signal representation is then propagated through the control memory to interact with data signals at one of the registers of the transmission equipment pair for diverting such data signals through a branch propagation path to the other register of that transmission pair.

In a second embodiment of the invention, the two sets of communication equipment includes a shift register and a buffer register; and each selectively gated branch propagation path from the shift register includes a stage of the buffer register. A priming signal propagated into a shift register of the analogous equipment set is gated into the corresponding buffer by application of a timing signal in a desired input time slot for the shift register of the transmission equipment set. Thereafter, that priming signal is interacted by gating operations with an output time slot timing signal for the transmission equipment set to produce a timing signal in a desired switching time slot during which a data signal is to be gated from the transmission equipment set buffer register to the corresponding stage of a transmission equipment set output shift register. The switching time slot timing signal causes the analogous equipment buffer to load the control memory.

BRIEF DESCRIPTION OF THE DRAWING

A more complete understanding of the invention and the various features, objects, and advantages thereof may be obtained from a consideration of the following detailed description in connection with the appended claims and the attached drawing in which:

DETAILED DESCRIPTION

Figure 1:
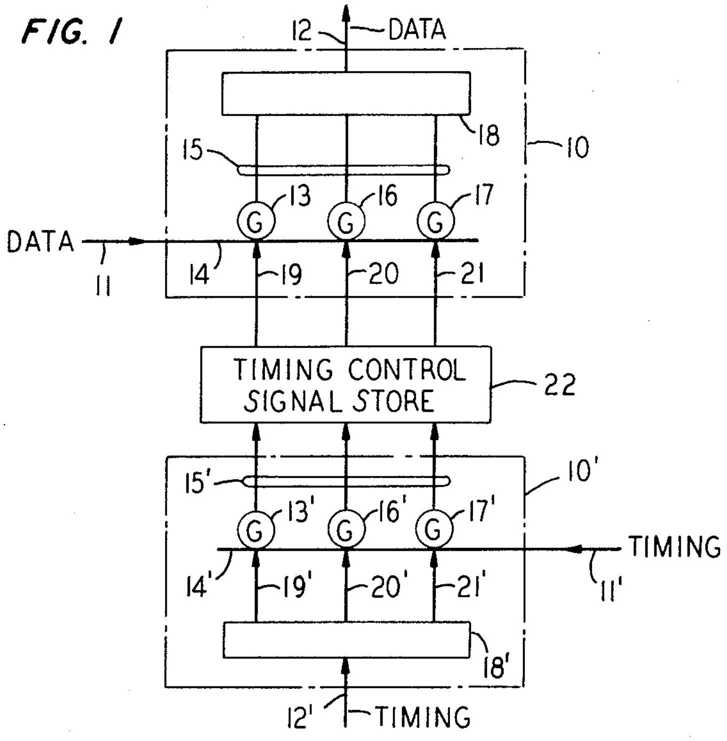
FIG. 1 is a functional diagram illustrating time coded signalling of the present invention.

FIG. 1 is a simplified functional diagram in block and line form illustrating the concept of time coded signalling in accordance with the present invention. Following a consideration of the functional diagram, specific, illustrative, structural embodiments will be discussed in connection with FIGS. 2 and 3.

A first set 10 of communication equipment for data signal transmission receives time division multiplex signals, here called data signals for convenience of reference, on an input time division signal path 11. These signals are transmitted through a data communication path in the equipment 10 to an output time division signal path 12. The data path is schematically represented as including a group of signal interacting gates 13, 16, and 17 past which data signals are propagated in path 14 in a stepwise fashion in successive time intervals during a time division signal frame. Branch propagation paths 15 couple outputs of the interacting gates to a further signal propagation path 18 which is further coupled to the output time division path 12. For convenience of description, the paths 15 are considered, in FIG. 1, to be arranged in an ordered sequence. In FIG. 1, that sequence corresponds to the sequence in which data signals from path 11 pass the signal interacting gates.

The equipment 10 further includes a control signal path comprising signal propagation circuits 19, 20, and 21 for applying time coded control signals to the gates 13, 16, and 17 from a timing control signal store 22. In the data path of the communication equipment 10, data signals are steered by the gates 13, 16, and 17 into different ones of the branch propagation paths 15 as directed by signals from store 22 and depending upon the type of communication function which is to be performed by the transmission equipment 10. For example, the invention is herein described, without limitation, as applied to a time slot interchanger which is advantageously of the type disclosed and claimed in our copending application Ser. No. 204,143, filed on even date herewith, and entitled "Dynamically Switching Time Slot Interchanger." In one embodiment of such a time slot interchanger, the overall data path of the transmission equipment includes an input shift register and an output shift register which are operated simultaneously but in opposite directions with respect to an ordered sequence of the branch propagation paths 15 between predetermined stages along the lengths of the registers.

In accordance with one aspect of the present invention, there is provided at least a second set 10' of data communication equipment, which is analogous to the equipment of the transmission set 10, and, therefore, is represented in FIG. 1 by functional representations of similar form and bearing primed versions of the same reference characters. In the analogous equipment 10', the input data path 11' directs signals for propagation past gates 13', 16', and 17'. Time coded signals, instead of time division data signals, are applied to the data path 11'. Time coded signals normally occur in a control signal path at a particular time within a time division signal frame as determined by the particular operation which is to be performed, e.g., a pulse is provided in a particular time slot when a certain gate is to be opened. On the other hand, a data signal occurs in a data communication path at a particular time as a function of the nature of an item of information being transmitted.

The time coded signals are applied to path 11' at only such times as are necessary to control the pattern of control signal information in the timing control signal store 22. Thus, there is applied to the input path 11' a time coded signal pulse $TS_i$ which occurs at the beginning of a time interval during which a particular data word that is to be switched in the transmission equipment set 10 is entered into that set from the data input path 11. Similarly, another time coded signal comprises, in one embodiment, a pulse $TS_o$ on signal path 12' and occurs at the beginning of a time division signal interval during which the transmission-equipment-switched, time slot signal is to be applied to output data line 12. Pulse $TS_o$ is coupled through analogous propagation path 18' and operates through one of circuits 19', 20', or 21' in the control path of equipment 10' to steer the pulse $TS_i$. The two time coded signals $TS_i$ and $TS_o$ interact in the data equipment set 10' in such a way as to determine automatically which of the gates 13', 16', and 17' will be utilized to direct a time coded output signal to a corresponding part of the signal store 22. Likewise, the same interaction also automatically determines, in one embodiment, the time slot during which such time coded signal will be so provided to the signal store 22. Thus, a time coded signal is directed into one of the branch propagation paths 15' in the analogous equipment set 10' at a time which causes the resulting control signal in store 22 to appear at the correspondingly designated one of the control signal path portions 19, 20, or 21 in the transmission equipment set 10. The latter control signal causes a data signal from path 11 to be steered through an appropriate part of the data path in transmission equipment set 10 to achieve the desired time slot shifting prior to application of that data signal to the output data path 12.

It can now be seen that the two equipment sets 10 and 10' are analogous in that they have similar data paths, control paths, and gated branch paths in the data paths. A data or timing signal is applied to an input data path in equipment 10 or equipment 10', respectively. A further timing signal is coupled into the control signal path of each equipment set. However, the analogous equipment set 10' produces a time coded signal output in a branch propagation path which corresponds to a branch path location in the transmission equipment set 10 into which a particular data signal is to be switched.

Figure 2:
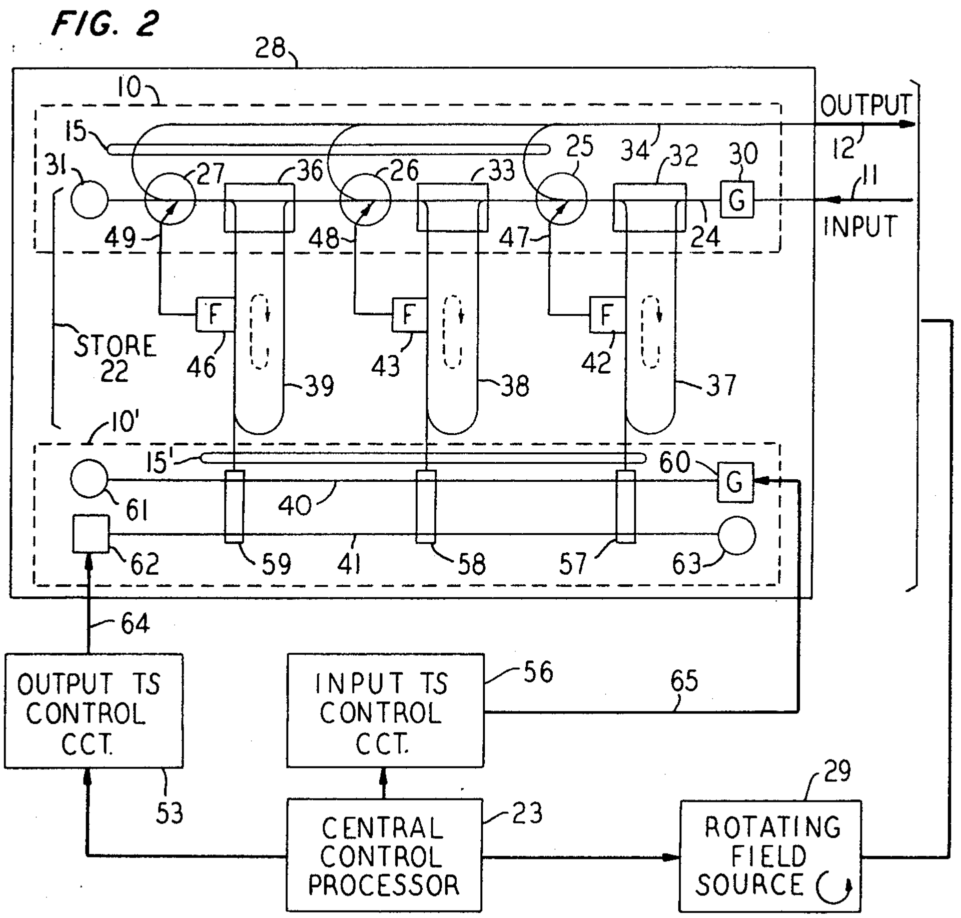
FIG. 2 is a schematic diagram of the invention as applied to a magnetic single-wall domain time slot interchanger.

In FIG. 2 there is shown a schematic diagram of a time slot interchanger which utilizes time coded signalling and which is implemented in a planar shifting technology wherein the positions of signal representations are controllably shifted in a homogeneous planar material. Functional structure groups that are the same as those found in FIG. 1 are designated by the same reference characters. The illustration in FIG. 2 relates to a magnetic single-wall domain form of planar shifting technology. In this embodiment the interchanger shift registers, the switching gates, the control memory, and the analogous equipment for address insertion to the control memory are all implemented in the mentioned magnetic domain technology. This interchanger is disclosed in greater detail in our aforementioned application, so it is here discussed only to the extent necessary to demonstrate the use of time coded signalling.

The single-wall magnetic domain technology is now well known in the art as evidenced by the numerous public documents on the subject. One overall presentation is found in *The Bell System Technical Journal*, Vol. XLVI, No. 8, October 1967, at pages 1,901 et seq. In essence, a slice 28 of material is provided which can host single-wall magnetic domains that are orthogonally oriented with respect to the plane of the slice. External bias, not shown, is advantageously employed to determine domain size and configuration. Domains are moved in the host material by providing various magnetic field concentrations to attract or repel a domain. In certain cases the domains interact to repel one another. One way to provide the mentioned field concentrations is to immerse the substrate slice of host material in a rotating magnetic field so that the field extends in the plane of the slice and is periodically reoriented. For cooperating with the field, there are provided, on the surface of the slice, magnetic material overlays which are configured in repetitive patterns of film elements to concentrate the field in different ways at element ends or angles as the field reorients. The field concentrations are instrumental in controlling the desired domain movements.

In FIG. 2 the host material slice 28 is schematically represented by a large solid-line rectangle. Within the rectangle the principal solid lines represent signal paths which are field access domain propagation paths of the type shown, for example, in A. H. Bobeck U.S. Pat. No. 3,534,347. A central control processor 23, the CPU for the communication system employing the illustrated time slot interchanger, is utilized in FIG. 2 and exercises control of a rotating field source 29 which provides the inplane reorienting field for the slice 28. Thus, the source 29 in the single-wall domain technology corresponds to a shift command signal source for the shift registers to be mentioned.

Multibit time slot signals are supplied in bit-series fashion on the input path 11 to a domain generator 30 of any suitable type. One form of domain generator and a collapser, or annihilator, are shown in the mentioned Bobeck patent. This arrangement assumes that the time slot signals are provided in an electrical format; but, of course, other formats could be utilized. An input shift register 24, in the transmission equipment 10, extends from the domain generator 30 to a domain annihilator 31 through alternate domain interaction regions 32, 33, and 36, and domain gating regions 25, 26, and 27. One gating region and an associated interaction region are provided for each half word of storage capacity in register 24. Only three such pairs of regions are indicated in FIG. 2 to preserve drawing simplicity. Many more would advantageously be included in practice.

The effect of the gating regions, hereinafter simply called gates, in the shift register 24 is to allow data domains to pass through the register data path toward annihilator 31 until an activated gate is encountered. Such a gate diverts the data domain from the data path of register 24 through an associated one of the coupling, or branch propagation, paths 15 to a corresponding stage of the interchanger output shift register 34. In the latter register the domains are shifted toward the right and ultimately leave the time slot interchanger to be coupled to a suitable utilization circuit, not shown. An interaction region has a similar effect with respect to the control memory and is used in conjunction with a data signal busy bit as described in our aforementioned application, to erase control signals from a memory loop. Registers 24 and 34 operate simultaneously for shifting domains in opposite directions with respect to branch propagation paths 15 between the registers and so produce a time slot interchanging effect.

Each of the control gates of the input shift register 24 is controlled by a control signal pattern which is circulated in a different control memory loop associated with that gate and comprising a part of the timing control signal store 22. Thus, in FIG. 2 control memory loops 37, 38, and 39 are associated with the control gates 25, 26, and 27, respectively. Each control memory loop is arranged to operate as a recirculating shift register, and contains a control signal magnetic domain pattern which is provided thereto by the operation of a pair of address insertion shift registers 40 and 41, in the analogous equipment 10', in a manner which will be subsequently described.

For the purposes of discussion of FIG. 2, it is assumed that domains circulate in the respective control memory loops in a clockwise direction as indicated by a broken-line arrow at each loop. Thus, domains are propagated upward along the left-hand side of each loop through respective domain fanout regions 42, 43, and 46 to the respective domain interaction regions 32, 33, and 36. From the latter interaction regions, recirculated domains are propagated downward in the right-hand side of each loop to complete the loop path. An input point is advantageously provided in the lower left part of each loop for writing in new control information from time to time.

Each fanout circuit responds to one input domain to produce a single output domain for continued circulation in the control memory loop, and additionally generates a domain pattern for appropriately controlling the control gate associated with the same memory loop. Domain fanout circuits of this type are known in the art. A fanout device and two domain splitting circuits that are useful in constructing a variety of fanout circuits are shown in a copending I. Danylchuck application Ser. No. 41,028, filed May 27, 1970, and which is assigned to the same assignee as the present application, and in an A. H. Bobeck U.S. Pat. No. 3,503,055 and an R. F. Fischer U.S. Pat. No. 3,564,518, respectively. Output from the fanout is applied to a domain propagation path for application to the associated control gate. Such propagation paths are schematically represented as the paths 47, 48, and 49 in FIG. 2, and correspond to the circuits 19, 20, and 21 in the transmission equipment control path.

The fanout domains are applied to one of the control gates, e.g., gate 26, for activating such gate. There they interact with data domains in the shift register 24. The fanout domains enter that data path in register 24 and are propagated to the left toward the annihilator 31. However, data domains from input path 11 are forced, by interaction with the fanout domains, to enter the associated one of the branch propagation paths 15 through which they are applied to the output shift register 34 for propagation to the output of the time slot interchanger. It is apparent, of course, that in each control memory loop the fanout region must be located with respect to the control memory loop input coupling point so that a control signal domain, which is entered into the loop from the shift register 40, will reach the fanout region and ultimately produce a fanout domain stream in time to interact at the associated control gate with the first domain of the time slot data word which is to be switched from input register 24 to output register 34 at such gate.

As in most time slot interchanging arrangements, it is necessary, for the interchanger of FIG. 2, to determine the input signal time slot number $TS_i$ during which a particular time slot signal is applied on the path 11 to the interchanger. It is also necessary to determine the number of the output time slot $TS_o$ to which the input time slot signal is to be shifted prior to transmission on the output path 12. Such input and output time slot information is advantageously obtained in accordance with any convenient one of the known pathfinding techniques that is suitable for the time division multiplex systems in which the interchanger is employed.

In accordance with the FIG. 2 embodiment of the present invention, it is not necessary to determine the number of a time slot $TS_{sw}$ in which to actuate a gate associated with one of the coupling paths 15 between the input and output shift registers of the time slot interchanger, nor is it necessary to make a special determination as to which branch path 15 will be utilized. The switching time slot number and the branch path determination are automatically accomplished by the way in which control signal information is written into the control memory loops.

Now, with the processor 23 having the input and output time slot numbers $TS_i$ and $TS_o$, the processor actuates an output time slot control circuit 53 and an input time slot control circuit 56 to generate time coded control signals which occur on circuits 64 and 65, respectively, at the times $TS_i$ and $TS_o$. Such signals are utilized to enter magnetic single-wall domains into the address insertion registers 40 and 41, respectively.

The address insertion registers 40 and 41 each has a total bit storage capacity which is equal to a frame of signal bits, as was the case for data shift registers 24 and 34, plus additional stages, not separately shown, having a stage delay during the shifting operation which is equal to one frame interval minus the delay from the beginning of a branch propagation path 15' to the gate, e.g., gate 26, that is controlled by the control domain. Registers 40 and 41 have congruent propagation paths and are spaced closely together so that there can be domain interaction between domains passing one another while being propagated in opposite directions through the registers. In particular, an interacting region is provided along the address insertion registers at each branch path 15' to the input to a control memory loop. Such interaction regions each includes a branch path as an alternate domain path into which a domain from register 40 is diverted if it appears in the interaction region simultaneously with a domain in register 41. Time coded signalling domains entering registers 40 and 41 from opposite directions are analogous to a data domain entering register 24 at generator 30 in time slot $TS_i$ and a vacant domain position entering the left end of register 34 in time slot $TS_o$. The $TS_i$ domain and the $TS_o$ position meet at opposite ends of a path 15, and the gate for that path is actuated to steer the data domain into the vacant position to reach the output of register 34 in time slot $TS_o$. Similar events occurring in registers 40 and 41 determine the path 15 to be used and the gating time to be used, and they also cause the corresponding memory loop to be properly written. Thus, the gate number and switching time slot number in the transmission equipment 10 have been automatically determined by applying the time coded signals $TS_i$ and $TS_o$ to the analogous equipment 10'.

Figure 3:
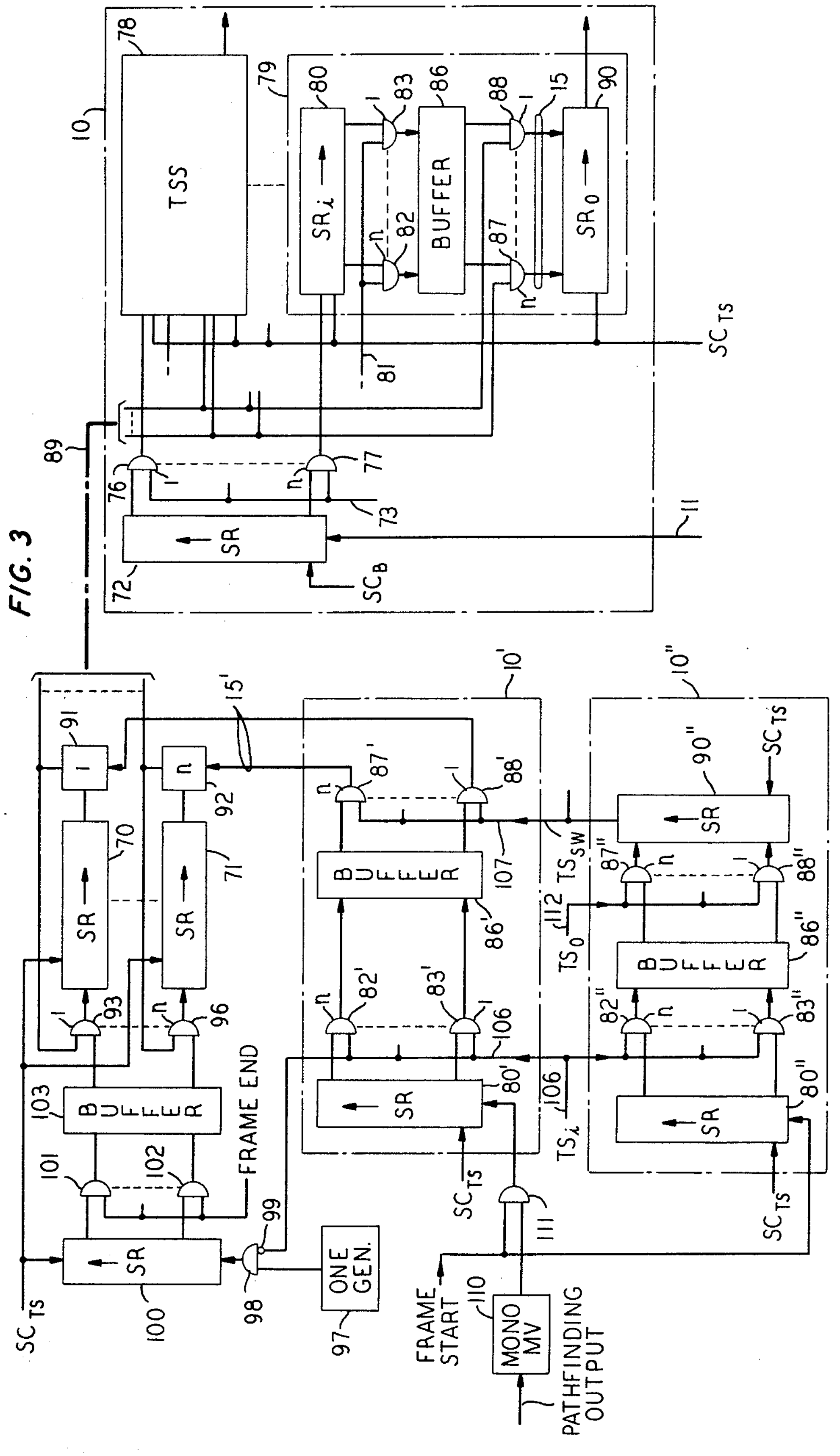
FIG. 3 is a schematic diagram of the invention as employed in a time slot interchanger which handles time division multiplex signals in bit-parallel word-series format.

FIG. 3 is a simplified block and line diagram for an application of time coded signalling to a control memory employing plural recirculating, or re-entrant, shift registers rather than a looped signal propagation path, as was a case in FIG. 2. Only two such re-entrant shift registers 70 and 71 are shown in the drawing, since these are all that are required to demonstrate the principles of the invention. Those registers are advantageously electric circuit shift registers of any appropriate type, and through which electric signal pulse trains are shifted in stepwise fashion. Shifting is actuated by shift command signals applied thereto in unison from a clocked shift command signal source, not shown, under the control of clock signals provided by a central processing unit, such as processor 23 in FIG. 2, for the communication switching network in which the invention is employed. Shift signal inputs are indicated by the reference character "SC" with a subscript to specify the time slot or bit rate.

In the embodiment of FIG. 3, the first set 10 of data communication equipment is adapted to perform time slot interchanging functions in bit-parallel on multibit time slot word signals. The latter signals are advantageously supplied in bit-series and word-series from an input time division signal path 11 to an input shift register 72 at the signal bit rate. Register 72 is one time slot word in length. At the end of each word interval, a timing pulse is applied on a circuit 73 from a timing signal source, not shown, to a plurality of coincidence gates — such as the gates 76 and 77. The timing pulse enables those gates to transfer the bits of the time slot word then residing in register 72 in bit-parallel to input circuits of respective ones of a plurality of time slot switchers, such as the switches 78 and 79 in FIG. 3. Gates 76,77 are further numbered 1 through $n$ to indicate the bit interval sequence of bits in register 72. Similar gate numbering is employed throughout equipment 10.

The time slot switchers, one of which is shown in detail, are illustratively of a type corresponding to one of the switcher embodiments shown in our aforementioned copending application. Briefly, a switcher includes circuits for performing a time slot interchanging function but the control memory for those circuits is separately shown. Within each switcher, time division signals are applied from a corresponding one of the gates 76, 77, at the time slot word rate to an input shift register 80. At the end of each time division signal frame, all of the shift registers 80 are full and their contents are transferred in bit-parallel by an end-of-frame timing signal on a circuit 81 through gates, such as the gates 82 and 83, to a buffer register 86. In the next following time division signal frame, time coded control signal pulses are applied in multiple from outputs of one or more of the control memory shift registers 70, 71 to corresponding time slot switcher selection gates such as gates 87 and 88.

Control memory output circuits comprise a control bus 89 from which each circuit is carried in multiple to an enabling input collection of a corresponding switching gate in each of the time slot switchers 78,79. Thus, for example, the output of the upper control memory shift register 70 is applied in multiple to enabling input connections of all of the selection gates 88 in the time slot switchers 78,79. Similarly the output of the bottom control memory shift register 71 is advantageously applied in multiple to an enabling input connection of the selection gate 87 in all of the time slot switchers 78,79.

At this point it is desirable to take note of the register shifting sequences in relation to time intervals of incoming data signals. At the end of each time slot the first bit is at the top of register 72 and is gated to switcher 78. Likewise the last, or nth, bit is at the bottom of register 72 and is gated to switcher 79. The control memory registers 70,71 are similarly ordered although one such register is provided for each data input time slot of a frame. At the end of a frame, the bits of the first time slot in a frame are at the right in registers 80 of the switches, and the bits of the last time slot in that frame are at the left. Consequently, control memory register 70 controls the time slots of operation for first time slot selection gates 88; and the last register 71 similarly controls the last time slot selection gates 87.

Outputs of gates 87,88 in each switcher are applied, by way of circuits 15, to corresponding stages of an output shift register 90 through which the signals are shifted to the right at the time division output signal word rate to be utilized in the bit-parallel array provided from the respective switchers. Alternatively the bit-parallel signals can be reformed into a single, larger time division signal frame of a size corresponding to the frame size of signals on the input path 11.

Each of the control memory re-entrant shift registers 70,71 has its output applied to a different one of a plurality of signal drivers, such as the two drivers 91 and 92, which are schematically represented by squares in FIG. 3. Each driver has an OR logic type of input connection to receive input signals either from its corresponding re-entrant shift register or from a corresponding different one of the outputs of the analogous communication equipment set 10′ which will be subsequently described. The output of each driver is fanned out to actuate a plurality of coincidence gates bearing the same bit interval number designation throughout the circuits of FIG. 3. Thus, each driver provides an output signal of appropriate type for actuating a corresponding one of a set of signal recirculating coincidence gates, such as the gates 93 and 96 in FIG. 3; and each driver supplies a further output signal through the control bus 89 to a group of switching gates in time slot switchers 78,79 as has already been described.

Assuming for the moment that appropriate control signal patterns have already been stored in the control memory shift registers 70,71, those signal patterns must be maintained in their respective re-entrant shift registers for the duration of any call connection which they enable. To this end a binary ONE signal generator 97 supplies a continuous train of binary ONE signals, at the time division signal word rate for signals on time division path 11, to an actuating input for a coincidence gate 98. The latter gate is also provided with an inhibiting input connection 99 for a purpose which will subsequently be mentioned; and in the absence of an inhibiting signal, the gate couples the train of ONE's to an input of a shift register 100. That register includes one stage for each time slot of a time division signal frame and each stage has an output connection which is coupled through one of a set of coincidence gates, such as the two gates 101 and 102, to corresponding storage, or registration, stages of a buffer register 103.

At the end of each time division signal frame, the frame-end timing signal enables all of the gates 101,102, and the contents of register 100 are transferred to register 103. Outputs of the respective stages of register 103 are continuously coupled to enabling input connections for the control memory recirculating gates 93,96 during a frame time. Register 103 advantageously provides a destructive readout so that the contents are erased as utilized by gates 93,96 during each frame. For example, buffer 103 is implemented by an array of monostable circuits which are set in accordance with signals coupled from register 100 and which automatically reset after one full time division frame interval. Buffer 103 can, of course, comprise bi-stable stages so that the information stored therein from register 100 remains intact until it is changed from the same source. In the latter case, a communication network central processing unit programming the entire network simply turns off the one's generator 97 and stops frame-end pulses to gates 101,102 after buffer 103 has been written and until new information must be entered therein.

In order to write new information into one or more of the control memory re-entrant shift registers in the time slot interchanger system of FIG. 3, it is necessary to determine the input time slot number $TS_i$ and the output time slot number $TS_o$ by appropriate path finding logic or program as already indicated. It will now be shown how a first set of analogous communication equipment utilizes the time slot numbers $TS_i$ and $TS_o$ for automatically computing the time slot number $TS_{sw}$ in which a switcher selection gate, e.g., gate 88, is operated. A second set of analogous communication equipment utilizes the time slot numbers $TS_i$ and $TS_{sw}$ for automatically writing the correct control memory shift register in the correct time slot, i.e., $TS_{sw}$, for the present embodiment. It will be apparent from the description of the time coded signalling technique for address insertion that such writing can take place only in control memory regions which are available for the insertion of new information.

When it is desired to write new address information into a control memory register, network control equipment will have at least partially completed a space pathfinding operation and placed a priming bit in a buffer register, such as a monostable multivibrator 110 to select a network stage and time slot interchanger in which a memory writing operation is to take place. A frame-start timing pulse at the beginning of the next frame enables a coincidence gate 111 for coupling the priming bit to an input of a shift register 80' in a first analogous equipment set 10'. This set is analogous to the input register and buffer register portions of each switcher in the equipment set 10. The register 80' is analogous to the register 80 and is operated at the time slot word rate for signals on the circuit 11 of FIG. 3. During the switcher input time slot $TS_i$, the aforementioned control signal $TS_i$ is applied on circuit 106 to all of the gates of a set of coincidence gates, such as the two gates 82' and 83'. The contents of register 80' are thereby transferred during the time of that pulse $TS_i$ to corresponding storage stages of a buffer register 86'. This action steers the priming pulse from the stage in which it then resides in register 80' through a corresponding one of the branch propagation paths including gates 82',83', to the corresponding stage of the buffer 86'.

Circuit 106 also extends to the inhibiting input connection 99 of the gate 98. Pulse $TS_i$ is timed so that the ONE pulse from generator 97 for the time slot word interval corresponding to the time slot $TS_i$ is deleted from the pulse train applied to register 100. At the end of the frame time including the activation of gates 82',83', the register 100 contents are transferred to buffer 103. During the first frame following that activation, there is no binary ONE signal in the stage of buffer register 103 corresponding to the time slot $TS_i$. Accordingly, the associated one of the re-entrant shift registers 70,71, in the control memory is unable to recirculate control information; and such information is, therefore, erased during that entire time division signal frame. Consequently, it is not necessary to know at any particular time where the erased information was stored in the register.

At the same time that the equipment set 10' is being operated as just outlined, a further analogous communication equipment set 10'' is being similarly operated. Equipment set 10'' is analogous to one of the switchers 78,79. The aforementioned frame start signal is entered into a shift register 80'' as the priming bit enters register 80'. Likewise, the time coded signal $TS_i$ enables analogous gates 82'' and 83'' to couple the contents of register 80'' to buffer register 86''. Now, however, the time coded output time slot signal $TS_o$ is applied, in the frame following the frame of signal $TS_i$, on a circuit 112 to analogous gates 87'' and 88'' for loading the analogous output shift register 90'' in bit parallel. The latter register is operated at the time slot rate to shift in the same direction as register 80''.

The frame start pulse emerges from register 90'' in the desired switching time slot $TS_{sw}$, at least one frame following the frame of signal $TS_i$. Thus, the $TS_i$ and $TS_o$ signals have interacted through analogous equipment gating and shifting operations to determine $TS_{sw}$. The $TS_{sw}$ signal is applied on a circuit 107 to enable gates 87' and 88'. Those gates apply signal representations from buffer register 86' to corresponding ones of the control memory output drivers 91,92 by way of circuit paths 15'. It will be observed in FIG. 3 that gates 82', 83' and 87', 88' in equipment set 10', and corresponding gates in equipment set 10'', are assigned signal bit numbers 1 through $n$ in the reverse sequence, with respect to signal shifting direction, as compared to the numbering sequence of corresponding gates in equipment set 10. This reversal is necessary in the illustrated embodiment to effect the automatic generation of the $TS_{sw}$ signal. At the pulse time $TS_{sw}$, the only stage of buffer 86' which includes a binary ONE signal is the one corresponding to the control memory register that must be rewritten; and that register was just erased in a preceding signal frame. Consequently, the output driver of the erased register will receive no output from its control memory register to interfere with the aforementioned output being received from buffer 86'. Address insertion output from activated gates 87',88' is applied by the selected driver in the manner already described, to time slot switcher selection gates and to corresponding register recirculation gates. Since this is a new signal frame, a new train of one's has been stored in buffer register 103; and recirculation gates 93,96 for any registers now being rewritten are enabled to allow that rewriting.

It should now be appreciated that the time coded signalling technique involves the application of timing pulses to communication equipment which is analogous to the transmission equipment being controlled. The resulting output of the analgous equipment is used for automatically writing the correct part of the transmission equipment control memory in the correct time slot. Inherent logic of the analogous equipment allows some flexibility in selecting directions of shifting and locations for applying particular time coded input signals.

Although the present invention has been described in connection with particular applications and embodiments thereof, it is to be understood that additional modifications, applications, and embodiments which will be obvious to those skilled in the art are included within the spirit and scope of the invention.

What is claimed is:

1. In combination, a first set of communication equipment for information signal transmission, said transmission equipment comprising a data signal propagation path for receiving an input signal in a time slot $TS_i$ and having a plurality of selectable branch propagation paths coupled thereto at predetermined points distributed along the length of said data path, a control signal propagation path, and plural signal interacting gating means coupled to said branch paths, respectively, and responsive to signals in both said data path and said control path so that a coincidence of signals in such paths at one of said interacting gating means selects the coupled branch path and enables such gating means for the transmission of data path signals through the selected one of said branch propagation paths to an output of said equipment in a time slot $TS_o$, a second set of communication equipment which includes equipment that is analogous to said transmission equipment in the provision of a data path with distributed branch propagation paths, a control signal propagation path, and gating means at the last-mentioned branch paths, respectively, and responsive to coincidence at one of said last-mentioned branch paths of timing signals applied to said analogous data path and control path for enabling signal transmission through such last-mentioned one branch propagation path, and control memory means including a plurality of recirculating signal storage loops having outputs coupled to provide control signals in predetermined patterns to said gating means, respectively, of said transmission equipment for enabling a branch propagation path therein and having means for coupling signals from branch propagation paths of said analogous equipment set to write said control signals in said loops, respectively.

2. The combination in accordance with claim 1 in which said analogous equipment comprises means, including said data path of said analogous equipment set, for applying said input timing signal $TS_i$ to at least one of said analogous set branch propagation paths, and means for inserting said output timing signal $TS_o$ in said control path of said analogous equipment set for propagation therein to at least one of said analogous set interacting gating means whereby a coincidence of said input and output timing signals at such gating means enables the corresponding branch propagation path of said analogous equipment set.

3. The combination in accordance with claim 2 in which said analogous equipment comprises a first shift register for providing said analogous data signal propagation path, and a second shift register for providing said analogous control signal propagation path.

4. The combination in accordance with claim 3 in which said first and second shift registers are magnetic single-wall domain shift registers arranged to shift in opposite directions with respect to a predetermined sequential order of said branch propagation paths, and said first and second shift registers are disposed to have essentially congruent propagation paths in such close proximity that a domain repulsion force is generated when domains propagating in said first and second shift registers pass one another at one of said branch propagation paths so that such domain in said first register is diverted into such branch propagation path.

5. The combination in accordance with claim 2 in which said analogous equipment data path comprises a first shift register, means for connecting said first shift register to receive a priming signal and propagate the same along such register, a buffer register, each stage of which is included in a different one of said branch propagation paths, first means for coupling contents of said first shift register into said buffer register in bit-parallel at selectable times, and second means for coupling contents of said buffer register to different parts of said control memory means in bit-parallel at selectable times whereby said priming signal is entered into one of said parts, and said analogous equipment control path comprises means for actuating said first coupling means in response to said input timing signal for selecting one of said branch propagation paths to which said priming signal has propagated by the time of occurrence of said input timing signal, and means for actuating said second coupling means for coupling the contents of said buffer register to said control memory means in response to said output timing signal.

6. The combination in accordance with claim 5 in which said actuating means comprises a further analogous equipment set including a second shift register connected to receive a pulse, at substantially the time of said priming signal, for propagation therethrough, a second buffer register, means for coupling contents of said second shift register into said second buffer register in bit-parallel in response to said input timing signal, a third shift register, and means for coupling contents of said second buffer register into said third shift register in bit-parallel, in response to said output timing signal, for propagation therethrough to actuate said second coupling means.

7. The combination in accordance with claim 5 in which said control memory means comprises plural reentrant shift registers each having an output connected to control actuation of a different one of said branch propagation paths in said transmission equipment set, a different recirculation controlling gate coupled between an output and an input of each of said shift registers for recirculating signals appearing at the output of such shift register, and means for controllably enabling said recirculating controlling gates.

8. The combination in accordance with claim 7 in which said controllable enabling means comprises an address insertion shift register for receiving binary coded signal representations, a buffer register, third means for coupling outputs of said address insertion shift register in bit-parallel to respective stages of the last-mentioned buffer register, means for coupling an output of each stage of said buffer register to enable a different one of said recirculating controlling gates in accordance with the binary coded character of the buffer register signal in such stage, and means for shifting into said address insertion shift register a predetermined pattern of binary signal representations.

9. The combination in accordance with claim 8 in which said shifting means comprises means for coupling a train of binary ONE signals to an input of said address insertion shift register, and means, responsive to said input timing signal, for inhibiting a binary ONE signal of said train during said input timing signal.

10. In combination in a time division multiplex communication system, first and second sets of communication equipment, each set including, first shift register means, selectable branch propagation paths for coupling signals from different stages of said first shift register means, and second shift register means, means for storing control signals for determining an actuation time slot $TS_{sw}$ for each of said branch propagation paths of said first set of equipment, said time slot $TS_{sw}$ being, in point of time, no earlier than a signal input time slot $TS_i$ for said first set first register means and no later than a signal output time slot $TS_o$ for said first equipment set, means for coupling branch paths of said first set between corresponding stages of said first and second shift register means, means for coupling different outputs of said storing means to actuate selectively respective branch propagation paths of said first set of equipment for coupling signals in such paths to said second register means of such set, means for coupling said branch propagation paths of said second set of equipment to different inputs of said storing means for writing said control signals in accordance with operations of said second set shift register means, means, including said second set first shift register means, for applying a timing signal initially occurring in said time slot $TS_i$ to at least one of said second set branch propagation paths, and means, including said second set second shift register means, for applying a timing signal initially occurring in said time slot $TS_o$, in cooperation with said $TS_i$ timing signal, for selectively actuating a branch propagation path of said second set.

11. The combination in accordance with claim 10 in which said means for applying timing signal $TS_o$ comprises means responsive to said $TS_i$ timing signal to produce an enabling signal at a unique stage of said second set second register means, the position of such stage along such register being indicative of the time position of said $TS_i$ timing signal in a time division multiplex signal frame, means, responsive to said $TS_o$ timing signal, for entering said enabling signal into said unique stage for propagation to the output of said second set second register means in time slot $TS_{sw}$, and means for applying said $TS_{sw}$ signal to enable actuation of all of said second set branch propagation paths whereby coincidence of said $TS_{sw}$ signal with said $TS_i$ timing signal at one such branch path initiates the writing of said storing means.

12. The combination in accordance with claim 10 in which said first and second register means of each equipment set are operated to shift signals in opposite directions with respect to said branch paths of such set, said first set including means for interacting a $TS_{sw}$ control signal with a $TS_i$ signal in the first register means thereof to direct a signal through a branch path and said second register means thereof to appear at an output of the latter means in the time slot $TS_o$.

13. The combination in accordance with claim 10 in which said first and second register means of each equipment set are operated to shift signals in the same direction with respect to said branch paths of such set, and said first set includes a buffer register having a different stage connected in each of the branch paths of such set, means for periodically transferring signal contents of said first register to said buffer register in signal bit parallel, and means, responsive to a $TS_{sw}$ control signal, for further transferring signal contents of a buffer register stage to a corresponding stage of said second register means.

14. In a time division multiplex communication system, a time division multiplex signal propagation path to which an input time slot signal is applied in a time slot $TS_i$ of a signal frame and which signal appears at a path output in a time slot $TS_o$, a plurality of gates each coupled to a different point along said path and actuatable at a selectable time slot $TS_{sw}$, a plurality of control memory means for controlling the selective actuation of said gates, respectively, and means for writing gate control signals in respective ones of said memory means, said writing means comprising first and second shift register means plural means for selectively establishing coupling between each of predetermined stages of said first shift register means and an input of a different one of said control memory means, means including said first register means for providing a timing signal indicating the time position, in a frame, of input time slot $TS_i$, means for operating said second register means to propagate a timing signal indicating the time position, in a frame, of output time slot $TS_o$, and means for interacting said timing signals to select one of said coupling means to write a corresponding one of said memory means.

* * * * *